Sept. 23, 1924.

N. POWER

MOVING PICTURE MACHINE

Original Filed June 6, 1916   5 Sheets-Sheet 1

Inventor
Nicholas Power
By his Attorney
W.B. Morton

Sept. 23, 1924.  N. POWER  1,509,256
MOVING PICTURE MACHINE
Original Filed June 6, 1916   5 Sheets-Sheet 3

Fig.3

Inventor
Nicholas Power
By his Attorney
W. B. Morton

Sept. 23, 1924.  1,509,256

N. POWER

MOVING PICTURE MACHINE

Original Filed June 6, 1916   5 Sheets-Sheet 4

Inventor
Nicholas Power
By his Attorney
W. B. Morton

Sept. 23, 1924.

N. POWER 1,509,256

MOVING PICTURE MACHINE

Original Filed June 6, 1916   5 Sheets-Sheet 5

Fig. 5

Inventor
Nicholas Power
By his Attorney
W.B. Morton

Patented Sept. 23, 1924.

1,509,256

UNITED STATES PATENT OFFICE.

NICHOLAS POWER, OF BROOKLYN, NEW YORK, ASSIGNOR TO NICHOLAS POWER COMPANY, OF NEW YORK, N. Y., A CORPORATION OF DELAWARE.

MOVING-PICTURE MACHINE.

Application filed June 6, 1916, Serial No. 102,068. Renewed January 26, 1922. Serial No. 532,036.

*To all whom it may concern:*

Be it known that I, NICHOLAS POWER, a citizen of the United States, and a resident of the borough of Brooklyn, county of Kings, city and State of New York, have invented new and useful Improvements in Moving-Picture Machines, of which the following is a specification.

This invention relates to improvements in moving picture machines, and has for its object to provide a machine in which the fire hazard from the use of inflammable films is reduced to a minimum without interfering with the ready access of the operator to the interior of the machine at all times.

A further object of the invention is to provide a machine which is completely enclosed in operation and which may be fully opened on two sides when the machine is to be threaded or otherwise adjusted, a portion of the closure of the casing being positioned when the machine is opened in the path of the light rays from the projecting lantern to prevent ignition of the film, which would otherwise be exposed at the projection aperture. The door or closure provided for this purpose is hinged in two parts so that the side of the machine not containing the aperture may be opened while the machine is running to inspect or adjust the film or the parts of the machine without relieving the tension of the film or otherwise interfering with the projection of the picture.

In the accompanying drawings I have illustrated a moving picture machine embodying the above designated improvements and other improvements in details of construction which will be more fully described in the following specification.

In said drawings.

Referring to the drawings, the machine is provided with a supporting frame which as shown comprises base plate 2, and a vertical longitudinal web 3 rising from the base plate in a position nearer one side edge of the plate than the other, in which web are supported the various moving parts of the machine. The main casing also includes the vertical webs at the front and rear edges of the base plate on the short side of the web 3 forming a three sided casing for enclosing and supporting the driving gears of the machine. The outer wall of the casing thus formed is closed by detachable plates 4 to permit of ready inspection, and to replenish the oil reservoir at the bottom of the casing formed by a transverse flange 6 integral with the main casting and of sufficient depth to enclose the bottom of the lowermost gear.

The mechanism of the moving picture machine comprises a main power shaft 7 supported at one side in the web 3 and extending across the base plate and through a bracket bearing 8 at the opposite side. On the end of this shaft within the casing is a spiral pinion 9 (see Fig. 3) which through suitable intermediate gears 11 drives a spiral gear 12 on the shaft of the lowermost feed sprocket 13.

Figure 3:
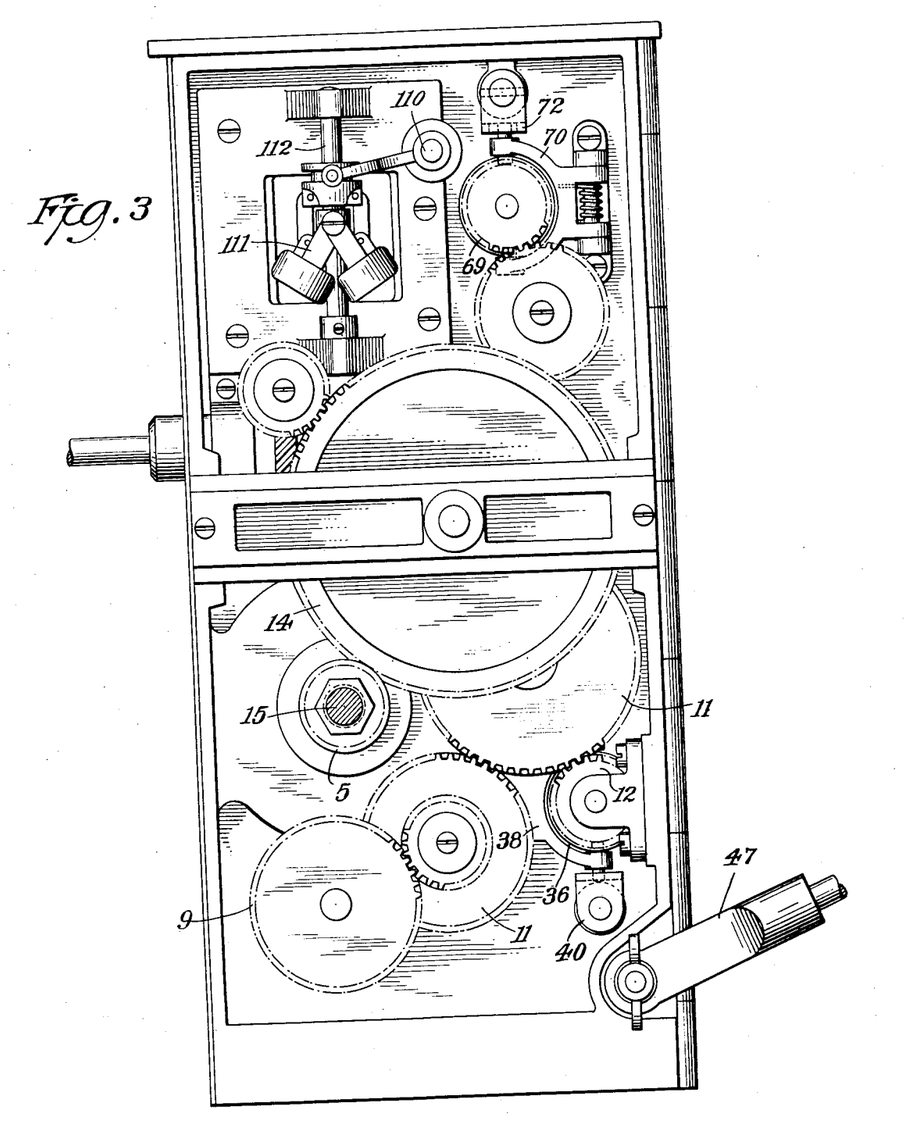
Fig. 3 is a side elevation of the machine showing the compartments for the operating gears with the outer walls of the compartments removed.

One of the gears 11 also meshes with a small pinion 10 on the central shaft of the machine which carries the master gear 14. The master gear also meshes with a pinion 5 on the shaft 15, to which power may be directly applied through a heavy belt pulley 16 when the machine is driven by power, the belt pulley acting as a flywheel for the machine when operated either by hand or power.

Figure 5:
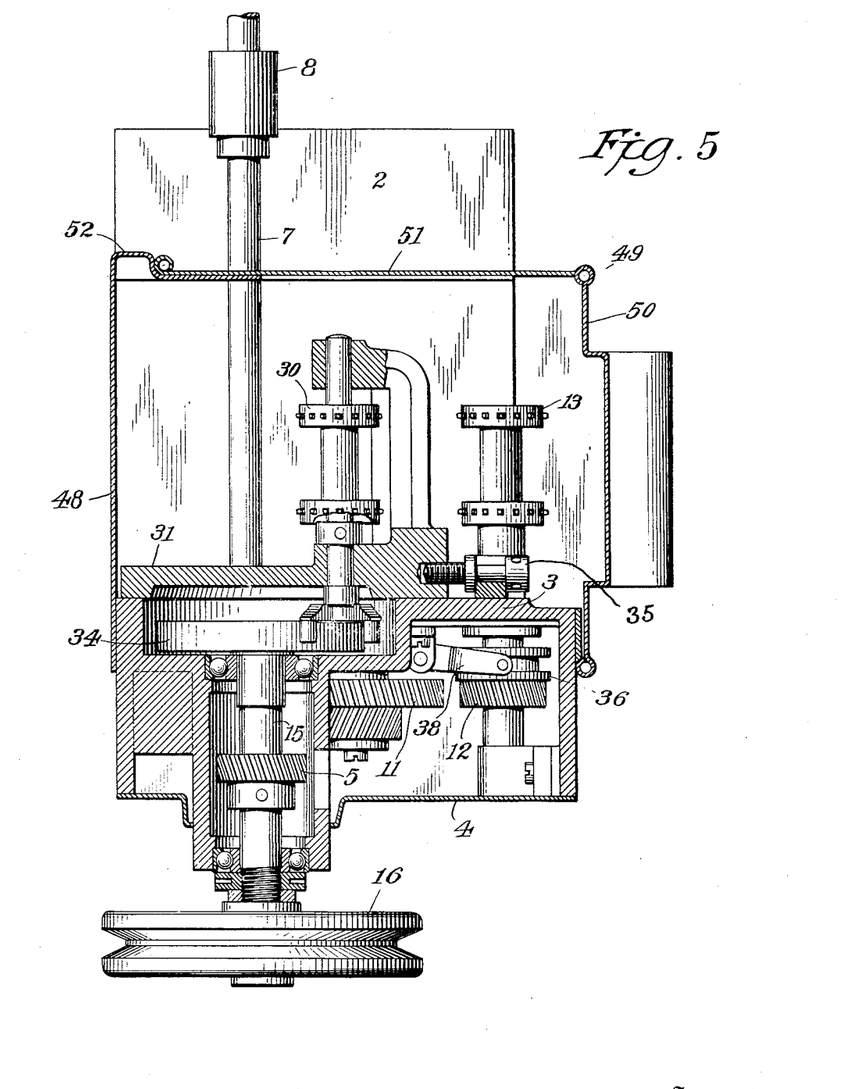
Fig. 5 is a transverse section on line 5—5 of Fig. 1.

The frame casting is shaped to provide a bearing sleeve for the shaft 15 enclosing the gear 5 and providing a ball bearing support for each end of the shaft as more particularly shown in Fig. 5. The web 3 is also shaped to provide a cavity or recess for receiving and enclosing the driving couple for actuating the intermittent sprocket as will be more fully described.

The film 21 is fed into the machine by an upper sprocket 20 whose shaft is supported in a bearing in the web 3 and is continuously driven through a suitable gear train from the master gear 14 of the machine. From the sprocket 20 the film extends upwardly in a loop and thence downwardly past the aperture 22 which is formed in the rear face of the ray chute 23 fixedly attached to the face of the web 3 and providing at its forward end a support for the lens tube 24.

Figure 1:
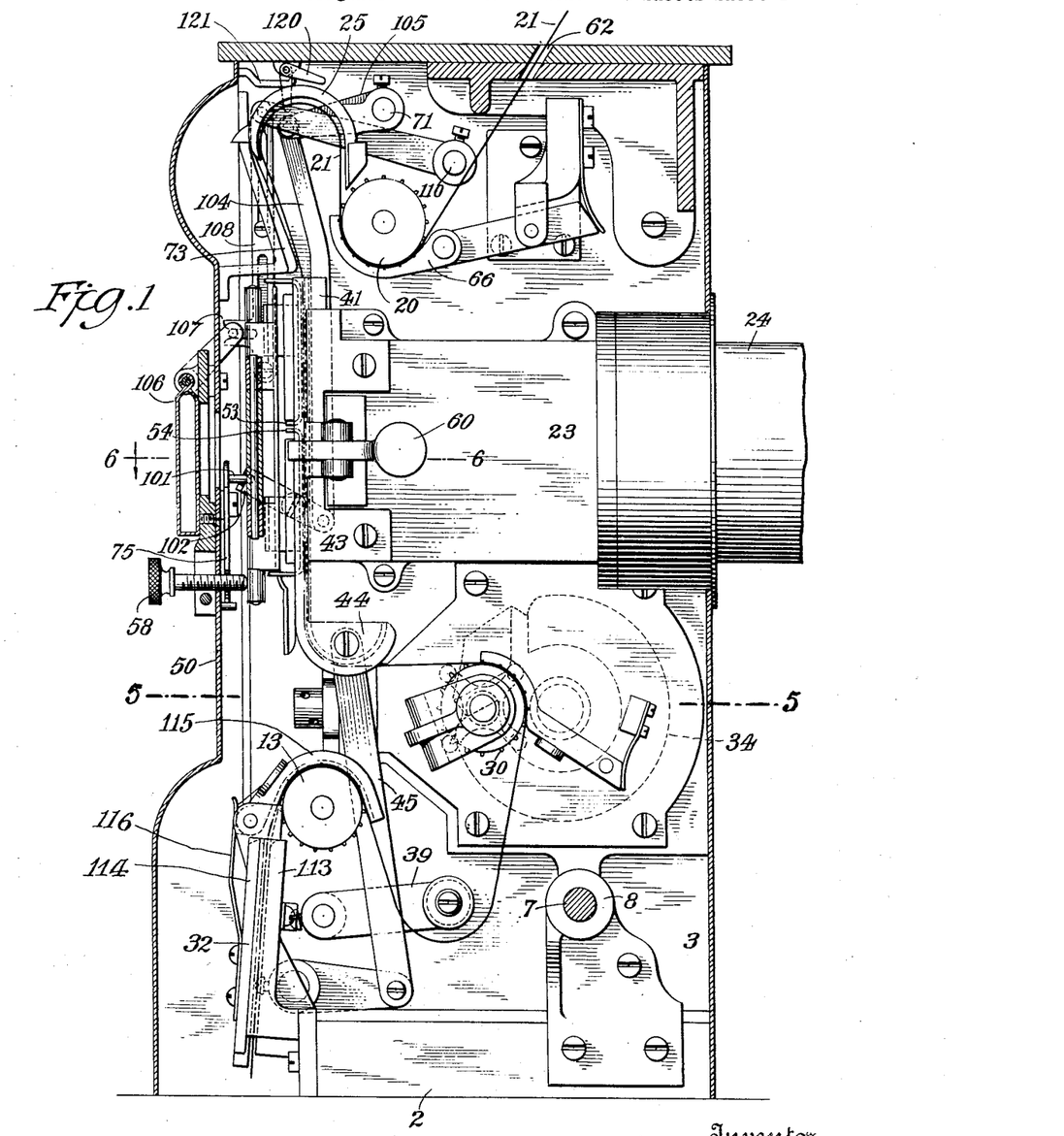
Fig. 1 is a longitudinal vertical section on line 1—1 of Fig. 2 through the casing of the machine showing the interior mechanism and inside elevation.

The film is fed past the projection aperture by means of an intermittently actuated sprocket 30 supported in fixed bearings carried by a plate 31 attached to the inner face of the web 3 and positioned so that the sprocket is materially in front of the plane of the aperture as illustrated in Fig. 1 to permit "framing" the picture without shifting the sprocket, the framing mechanism being the same as disclosed in my prior application No. 873,253, filed November 21, 1914. The film passes over the top of the sprocket, thence downwardly in a loop from the intermittent sprocket to the lower continuous sprocket 13 from which the film passes through the lower film guide 32, thence through the lower magazine valve, not shown, into the lower magazine where it is wound around the receiving reel in the usual manner.

The intermittent sprocket is preferably driven by a special intermittent driving couple, forming the subject matter of my prior Patent No. 1,129,121, dated February 23, 1915, the cam 34 of the said couple being rigid with the shaft 15 carrying the motor pulley 16. The cam lies in the recess formed on the inner face of the web 3 which recess is closed by the plate 31 to form an oil-tight casing for the intermittent coupling. The plate is held in place by screws in slightly enlarged holes in the inner face of the plate and is adjustably held against lost motion on the screws by means of an adjusting screw 35 in the rear edge of the plate and engaging a block on the inner face of the web whereby the position of the plate may be adjusted with the utmost accuracy to maintain the cam and "pin wheel" of the intermittent coupling in proper relative positions.

The lower sprocket is driven from the pinion 12 on the sprocket shaft by an automatic clutch comprising a modified form of the loop setter mechanism of my prior Patent No. 1,051,632, dated January 28, 1913.

The clutch in the present application (see Figs. 2 and 5) comprises a sleeve 36 mounted on the shaft adjacent the pinion 12 and provided with axially projecting pins passing through holes in the pinion 12 into the path of the clutch pins 37 set in a flange fixed on the sprocket shaft. The sleeve 36 is shifted on the shaft through a distance sufficient to engage and disengage the clutch pins by means of a fork 38, pivotally mounted between the gear 12 and the face of the web 3 and having a spring surrounding the pivot of the fork and operating to normally hold the clutch in engagement. The clutch pins are spaced apart a proper distance to give the desired slack to the film by the relative movement of the sprocket and shaft through the distance between the pins. The automatic disengagement and reengagement of the clutch is effected by the film through the medium of an arm 39 pivoted on the inner face of the web 3 and having a roller overlying the loop of the film. The pivot of the arm projects through its bearing in the web 3 and carries on its outer end a bent arm 40 whose upper face is provided with a cam engaging the projecting end of the lower pin of the fork 38 so as to shift the fork to disengage the clutch upon pivotal movement of the arm 39 produced by lifting the roller in the manner described in my prior patent above referred to.

The "framing" of the film is effected by means of a movable guide-plate 41 mounted for vertical reciprocation across the rear face of the ray chute and provided with an aperture 42 of somewhat more than double the height of a single picture of the film to permit sufficient movement of the film to frame the picture under all conditions of operation. The guide-plate 41 is mounted between the side pieces 43 fixed to the rear face of the ray chute and overlapping the inclined edges of the plate 41.

The lower end of the plate 41 extends beneath the ray chute, and attached to the rear face of the plate or integral therewith is a guide-shoe 44, whose outer surface is curved in a substantially semi-circular form, to direct the film toward the intermittent sprocket.

Figure 2:
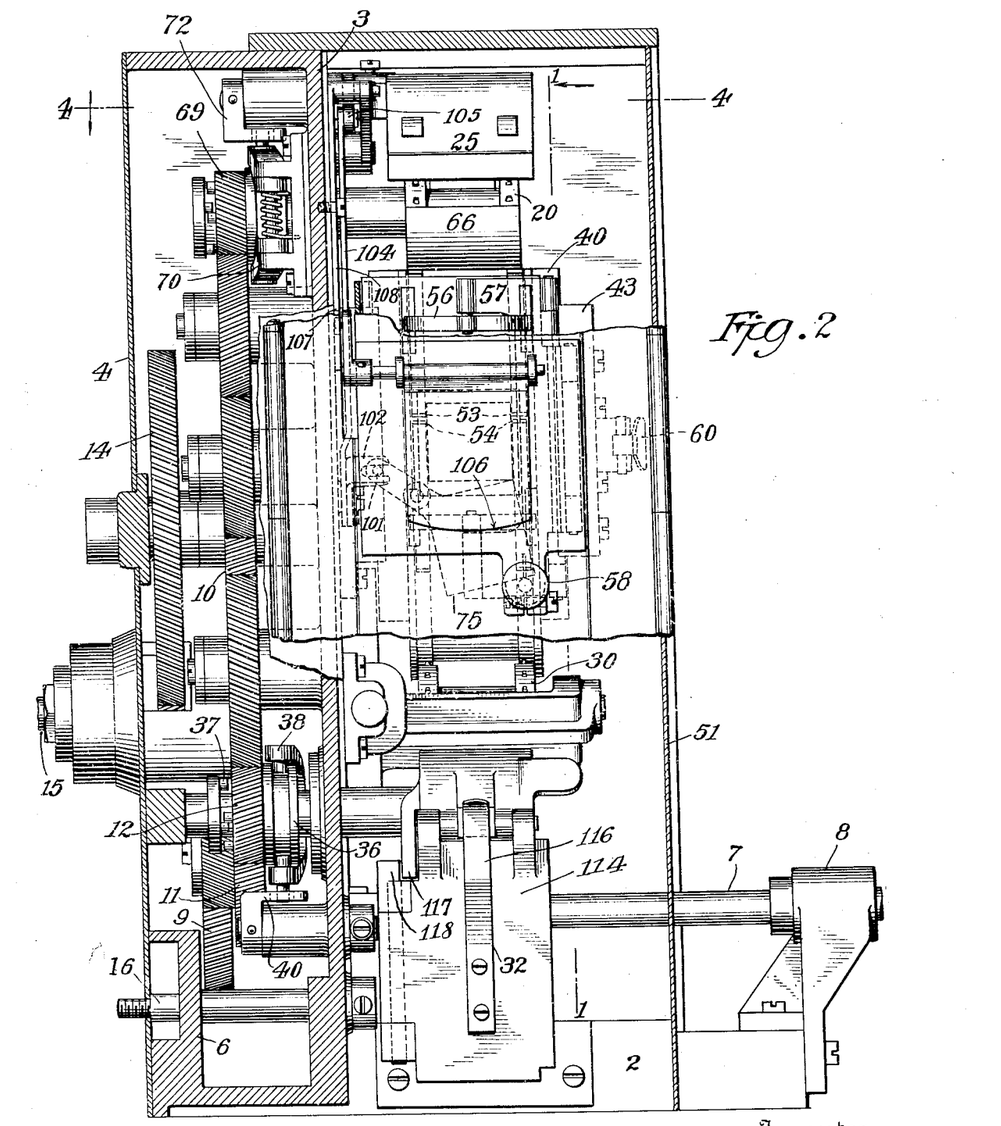
Fig. 2 is a rear view of the machine partly in section on line 2—2 of Fig. 4 with some of the parts broken away.

The guide-plate 41 is vertically adjusted to vary the position of the picture at the aperture by means of a link 45 pivoted to the inner end face of the guide-shoe and connected at its lower end to a rock arm 46, attached to a spindle projecting through the web 3, and also across the oil reservoir and through the outer face of the casing to permit the attachment of the framing lever 47 to the outer end thereof, as illustrated in Figs. 2 and 3.

Figure 4:
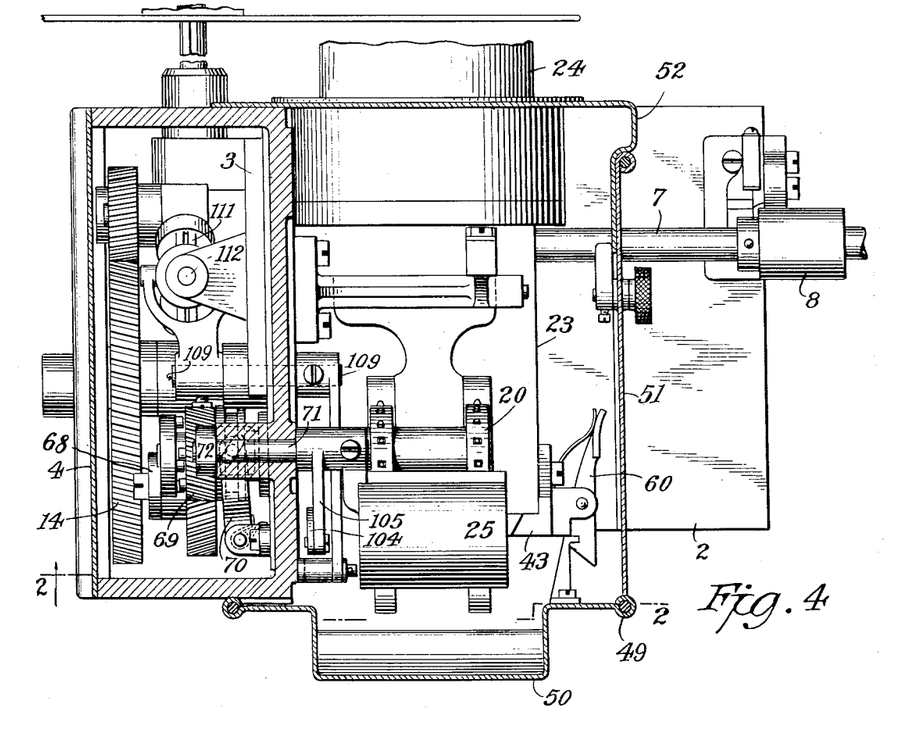
Fig. 4 is a transverse section on line 4—4 of Fig. 2.

The film feeding and guiding mechanism of the machine is preferably completely enclosed in a casing, one side of which is formed by the web 3. The front wall of the casing is preferably formed of a piece of sheet metal 48 rigidly attached to the front wall of the gear casing. The other two sides of the casing are also of sheet metal and are hinged together, the hinge forming the corner of the casing as indicated at 49. The other edge of the rear wall 50 of the casing is hinged to the rear face of the main frame whereby a double door is produced which may be opened in part by opening the side wall 51, or as a whole by turning the door on its hinge connection with the main frame. The piece forming the front wall of the casing is bent rearwardly at its free edge, as shown in Fig. 4 to provide a jamb 52 for the door to close and latch against.

The tension guides for holding the film at the projection aperture are preferably mounted on the inner face of the rear wall 51, and comprise upper and lower frames 53, 54, each of which is provided with shoes at each side engaging the marginal edges of the film to frictionally hold the film against the face of the guide-plate 41 between the marginal edge guides of the plate. The frames are mounted for movement toward and from the guide plate in a bridge 55 supported on the inner face of the rear wall, the shoes being yieldingly held against the film by means of leaf springs 56 attached at their middle points to the upper and lower edges of a plate 57 pivotally mounted between the bridge and the wall of the casing, said springs engaging with their free ends against the rear edges of the frames 53, 54. The springs 56 are mounted on the plate 57 in order that their tension may be varied from the outside of the casing by means of the adjusting screw 58, set in the rear wall and engaging the lower edge of the plate.

In order that the tension devices may be removed as a unit in case of breakage of the springs or other accident, the bridge 55 is not fixed to the inner face of the door but is hinged thereto by a hinge 201 between the edge of the bridge and a bracket 202 projecting from the face of the door. The other edge of the bridge is provided with projections which engage behind a bracket on the other side of the door, the bridge being held advanced toward the aperture plate by the pressure of the tension springs. In order that the bridge may be easily removed the hinge pin is not fast to either bracket or bridge, but is adapted to be withdrawn in the manner described in my prior Patent No. 1,270,866, granted on a divisional application of this application.

The rear wall of the door is preferably provided with a latch whereby the tension frames may be held in proper position against the film, at the same time allowing the side portion of the door to be opened to permit the operation of the machine. This latch 60 is pivoted on the face of the ray chute in position to engage a cooperating projection on the rear portion of the door when it is fully closed, as shown in Fig. 4 of the drawing.

When the casing is fully opened to thread the machine, the side door may be turned to intercept the light from the lamp thereby preventing overheating and possible ignition of the film. The positioning of the door in this manner may be positively effected by means of a pin set in the top of the base board of the stand to engage the bottom of the side door when the rear door is opened sufficiently to pass the pin, or other suitable stop, such as an angle to receive the corner of the door.

The film enters the machine from the upper magazine, not shown, through a slot 62 in the top wall of the casing and is engaged by the upper sprocket against which it is held by a shoe 66 pivoted to the wall of the frame and having its edges spring held over the flanges of the sprocket to hold the film in engagement with the sprocket wheel. The film engaging edges of the shoe are provided with slots for the free passage of the sprocket teeth and a stop is provided to hold the shoe spaced from the face of the sprocket to avoid rubbing the film. The end of the shoe causes the film to be directed upwardly as it leaves the sprocket, whereby the upper loop is formed in the film between the sprocket and the aperture. The upper sprocket 20 is also preferably driven through the medium of an automatic clutch similar to the loop setter clutch of the bottom sprocket, the purpose of such clutch being to automatically stop the upper sprocket upon abnormal enlargement of the upper loop and to re-clutch the sprocket when the extra slack has been taken up by the continued operation of the intermittent feed. This upper clutch comprises a clutch member 68 attached on the end of the sprocket shaft and carrying clutch pins similar to the pins 37 and adapted to be engaged by complementary clutch pins slidingly mounted in the driving pinion 69 on the sprocket shaft. The clutch is operated through the medium of the fork 70 and a rock shaft 71 carrying a cam piece 72.

Attached to the shaft 71 is a curved hood or loop 25 overlying the upper loop of the film 21 and shaped to conform to the position taken by the loop in the normal operation of the machine. The hood 25 is out of contact with the upper face of the loop but closely adjacent thereto so that abnormal enlargement of the loop will cause the loop to lift the cap imparting a rocking motion to shaft 71.

The movement of the rock shaft 71 releases the clutch when the cap 25 is raised by the loop, while the weight of the cap will turn the shaft to re-set the clutch when the extra slack is taken up.

The threading of the machine is easily accomplished with a loop of the proper length above the aperture by using the upper loop cap 25 to measure the length of the loop. In so threading the machine the framing guide 41 is adjusted to its most elevated position and the machine threaded as far as the aperture, sufficient film being left above the aperture for the loop to coincide with the under face of the loop cap. The film will then be threaded around the intermittent sprocket and the framing carriage lowered, thus drawing the film away from the loop cap so that the latter will not be raised by the first advance of the film. To better measure the loop and hold it in position for the force of its enlargement to be directed against the loop-cap there is provided a fixed guide 73 attached to the rear wall of the door between the edge of the loop cap and the top of the tension guides.

In order to hold the loop cap in its lower position while the machine is being threaded so that the clutch of the upper sprocket will not be released, there is provided a pivoted dog 120 which engages the shutter-operating arm to hold the arm and with it the loop cap, in its lower position when the door is opened, as it must be when the machine is threaded. When the door is closed to bring the tension shoes against the film so that the machine may be operated the dog is released by means of a pin 121 projecting from the inner face of the door which engages the dog, and thrusts it out of the way, leaving the loop cap free to be raised by any accumulation of film between the aperture and the upper sprocket.

Figures 6, 7, 8:
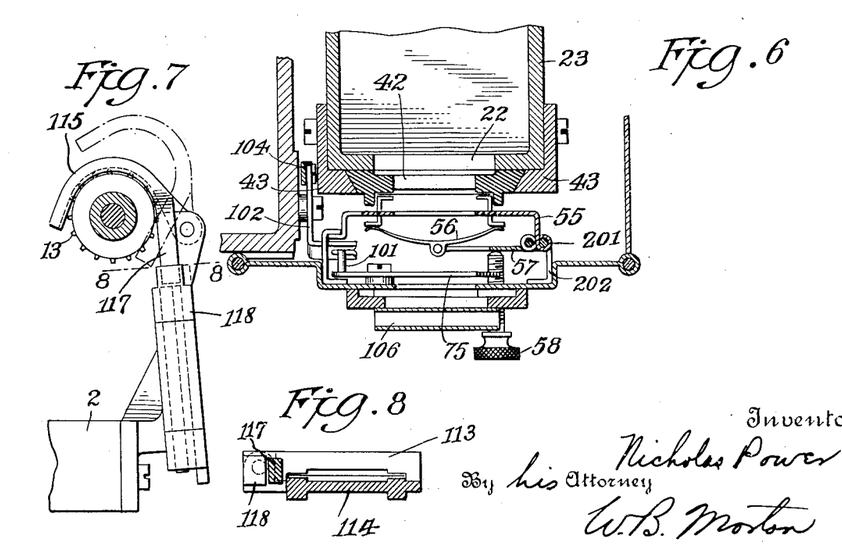
Fig. 6 is a sectional detail view on line 6—6 of Fig. 1 at the projection aperture showing the construction of the tension guides.
Fig. 7 is a detail view of the lower film guide.
Fig. 8 is a section thereof on line 8—8 of Fig. 7.

The chief cause of the enlargement of the upper film loop is the failure of the intermittent sprocket to advance the film when it encounters sprocket holes that are torn. When this happens the film is held stationary at the aperture by the tension frames, while the upper sprocket continues its motion. In order to prevent the ignition of the film when stationary at the aperture I preferably arrange an automatic shutter 75 pivoted to the inner face of the rear wall of the door back of the bridge supporting the tension shoes. The shutter is pivoted for movement in its own plane parallel to the face of the door on a pivot set just below and to one side of one lower corner of the aperture in the door. The shutter is shown in dotted lines in Fig. 2 and is provided with an integral crank arm extending beyond its pivot toward the web 3 of the machine frame. The crank arm has fixed in its end a pin 101 projecting away from the crank arm and adapted to engage when the door is closed with a fork 102 pivoted to the adjacent edge of the web 3 as shown in Fig. 6. The other end of the pivoted fork is connected by a link 104 with a rock arm 105 fixed to the hub of the loop cap 25 so that when the loop cap is raised by the accumulation of film between the sprocket and the tension guide, the free end of the fork will be depressed, thereby raising the shutter into position in front of the aperture in the door and cutting off the light from the film. In case the accumulation of film is taken up by the continued operation of the machine, as is sometimes the case, when the defective portions of the film are not of sufficient extent for the intermittent sprocket to completely lose its driving engagement, the weight of the loop cap will rock the fork on its pivot to again lower the shutter and uncover the aperture without action by the operator. If the fault does not correct itself at once, the operator can open the side wall of the door and adjust the film.

In addition to the shutter 75 the machine is provided with the usual centrifugally operated fire shutter 106 arranged to cut off the light from the film at the aperture when the machine is stationary or when it is not operated at sufficient speed to properly project the picture. This shutter is pivoted on the outer face of the door above the aperture to swing toward and away from the door. The shutter is operated by a rock arm projecting through a slot in the door and having a pin at its inner end which is engaged by a fork 107 carried by a bar 108 mounted for vertical movement on screws or pins projecting from the face of the web 3. The upper end of the bar 108 is pivotally connected to a rock arm carried by a pin or shaft 110 projecting through a bearing in the web 3 and carrying on its outer end a fork engaging the sliding hub of a centrifugal ball governor 111 supported by a vertical shaft 112 driven from the gear train of the machine. The centrifugal action of the balls of the governor will raise the hub in the usual manner of such governors, thereby rocking the pin 110, depressing the bar 108 and elevating the shutter 106 whenever the speed of rotation of the driving shaft of the machine is sufficient to effect the projection of the picture.

When the door is so opened the tension guides are also opened, so that the entire path of the film is clearly accessible to permit a ready and proper threading of the machine in the shortest possible time. The threading of the machine is also facilitated by the construction of certain of the film guiding parts as will be later described.

The lower film guide (see particularly Figs. 1, 2, 7 and 8) for directing the film from the lower sprocket into the magazine comprises a fixed plate 113 attached to the base of the machine and having a film guiding face extending substantially from the periphery of the sprocket to the base of the machine where the film enters between the rollers of the lower magazine valve or film guide, not shown. The plate 113 has hinged along its inner vertical edge a cooperating plate 114 the two plates being recessed as shown more particularly in Fig. 8, to completely enclose the film and provide guide tracks at each edge for the margins of the film. The shoe 115 for guiding the film around the lower sprocket is pivoted to the hinged plate 114 across its upper edge and is held in operative position enclosing the upper face of the sprocket by means of a leaf spring 116 attached to the back of plate 114 and engaging cam faces on the back of the shoe, two cam faces being provided so that the spring will hold the shoe in either open or closed position.

To prevent the plate 114 being turned on its vertical hinge until after the shoe is clear of the top of the sprocket the shoe is provided with a downwardly extending arm 117 which, when the plate 114 is closed against the fixed plate, will just clear the side of a fixed lug 118 projecting from the top of the fixed plate 113 as shown in Figs. 1 and 8. The arm and lug will prevent the plate 114 being opened on its vertical hinge when the parts are in the full line position shown, and until the shoe is open sufficiently for the arm to clear the lug as shown in dotted line position in Fig. 7, in which position it will be held by the spring. In this position the arm clears the top of the lug and as the guide is opened the end of the arm rests on the top face of the lug so that the shoe is positively held in open position until the guide is again fully closed. By this arrangement the sides of the grooves in the inner face of the shoe which lie over the teeth of the sprocket are prevented from contact with the teeth, which would have the result of roughening the teeth so that the film would be torn at the sprockets.

The operation of this guide in directing the film into the magazine is substantially similar to that described in my prior patent above referred to. The walls of the guide confine the film so closely that it cannot buckle under the thrust of the sprocket and even though there is pull on the film when the winding reel is interrupted, the film will be forced into the magazine where it is fully protected from danger of ignition.

I claim:

1. In a moving picture machine the combination of a frame or casing having two fixed walls, the other two walls being hinged together and supported on a single hinge whereby the casing may be opened from one side only or from two sides, and film feed mechanism within said casing.

2. In a moving picture machine the combination of a frame or casing having fixed front and side walls, a rear wall hinged to the rear edge of the fixed side wall and a side wall hinged to the edge of the rear wall whereby the side wall may be opened without opening the rear wall, and film feed mechanism supported in said casing.

3. In a moving picture machine the combination of a frame or casing comprising fixed front and side walls, a rear wall hinged to the rear edge of the fixed side wall cooperating film-guiding devices supported by said fixed wall, and said hinged wall respectively for maintaining the film in position for projection, and a closure for the fourth side of the casing hinged to the edge of the rear wall to be opened independently of said rear wall.

4. In a moving picture machine the combination of a frame or casing comprising fixed front and side walls, a rear wall hinged to the rear edge of the fixed side wall, cooperating frame-guiding devices supported by said fixed wall and said hinged wall respectively for maintaining the film in position for projection, and means for securing said hinged wall in film-guiding position, and a side wall hinged to the edge of said rear wall forming a completely enclosed casing.

5. In a moving picture machine the combination of a frame or casing adapted to support the mechanism of the machine, a shield for said mechanism consisting of two hinged walls and covering two sides of said frame, said shields being hinged to said frame on one edge, a latch for holding the directly supported wall in closed position and a separate latch for the second wall.

6. In a moving picture machine the combination of a frame, a casing adapted to support the mechanism of the machine, a shield for the face of the machine toward the projecting lantern consisting of a door hinged to the adjacent edge of the frame or casing. film engaging devices carried by said door for holding the film in projecting position at the light aperture, a latch for holding said door in film-engaging position and a hinged extension on said door adapted to be opened and closed with relation to the side of the machine while the main portion of the door is held in film-engaging position.

7. In a moving picture machine the combination of a frame, a casing adapted to support the mechanism of the machine, a shield for the face of the machine toward the projecting lantern consisting of a door hinged to the adjacent edge of the frame or casing, film-engaging devices carried by said door for holding the film in projecting position at the light aperture, a latch for holding said door in film-engaging position and a hinged extension on said door adapted to be opened and closed with relation to the side of the machine while the main portion of the door is held in film-engaging position said hinged extension being shaped to intercept the light from the lantern when the main portion of the door is swung away from the machine frame.

8. In a moving picture machine the combination of a frame or casing consisting of two fixed walls adapted to support the mechanism of the machine and two movable walls forming with the fixed walls a complete enclosure for the mechanism, said movable walls comprising a rear wall hinged to the adjacent fixed wall and having a projection aperture, and a side wall, a hinged extension of the rear wall, film tension devices supported on said rear wall and a safety shutter also supported on said rear wall and adapted to be brought into operative engagement with the mechanism of the machine when the rear wall is closed.

9. In a moving picture machine a frame or casing having a vertical longitudinal web, film-feeding devices supported on said web on one side thereof, driving mechanism for said devices on the other side of said web and separate enclosures for the feeding devices and the driving mechanism, the enclosure for said feeding devices comprising a shield hinged on said web and covering the said devices at the rear and on one side, the rear and side portions being hinged together.

Signed at New York city, in the county of New York and State of New York, this 19th day of May, 1916.

NICHOLAS POWER.